Feb. 20, 1934.   J. DE LA CIERVA   1,947,901
AIRCRAFT OF THE ROTATIVE WING TYPE
Filed Dec. 4, 1930   3 Sheets-Sheet 3
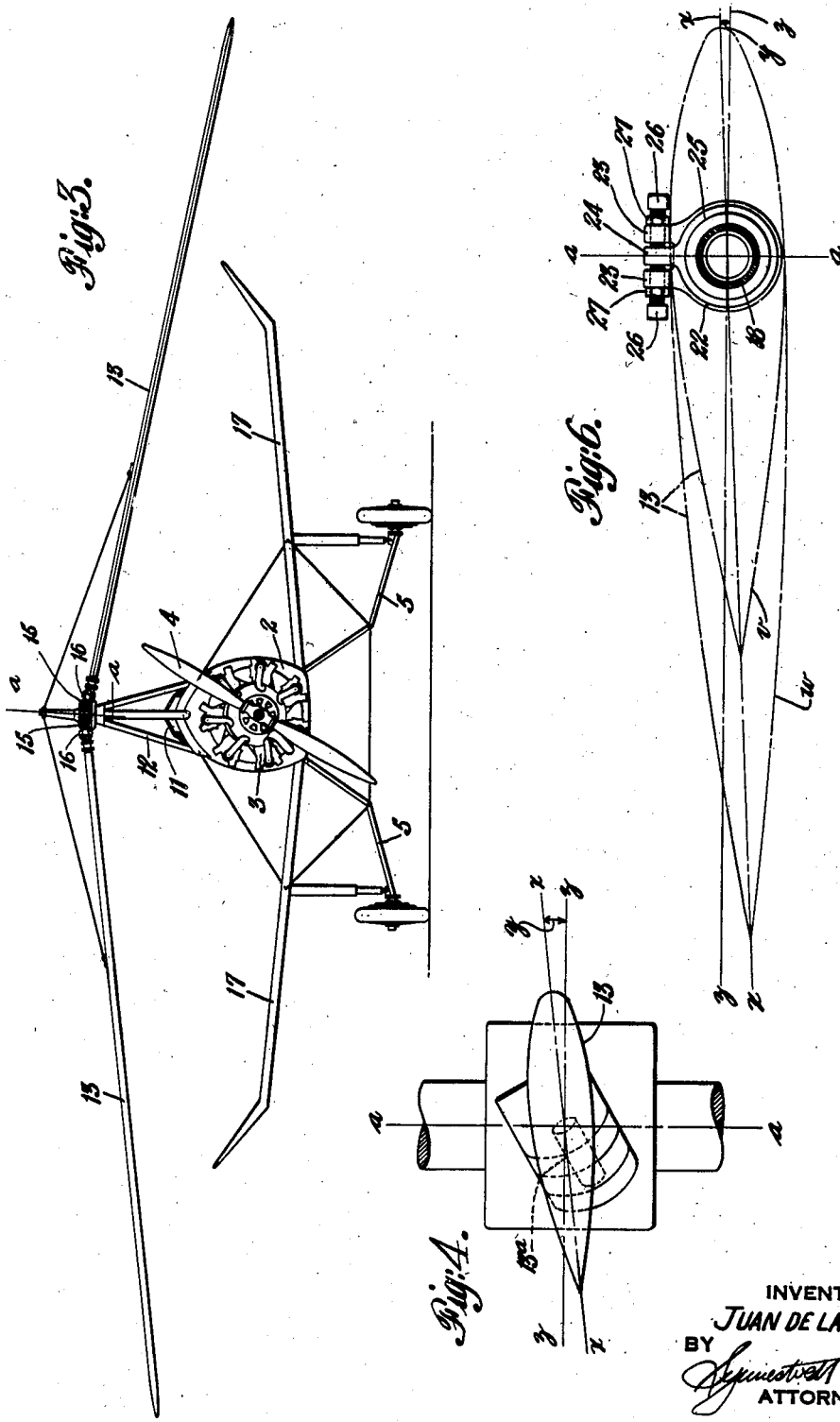
INVENTOR
JUAN DE LA CIERVA
BY
ATTORNEYS Patented Feb. 20, 1934

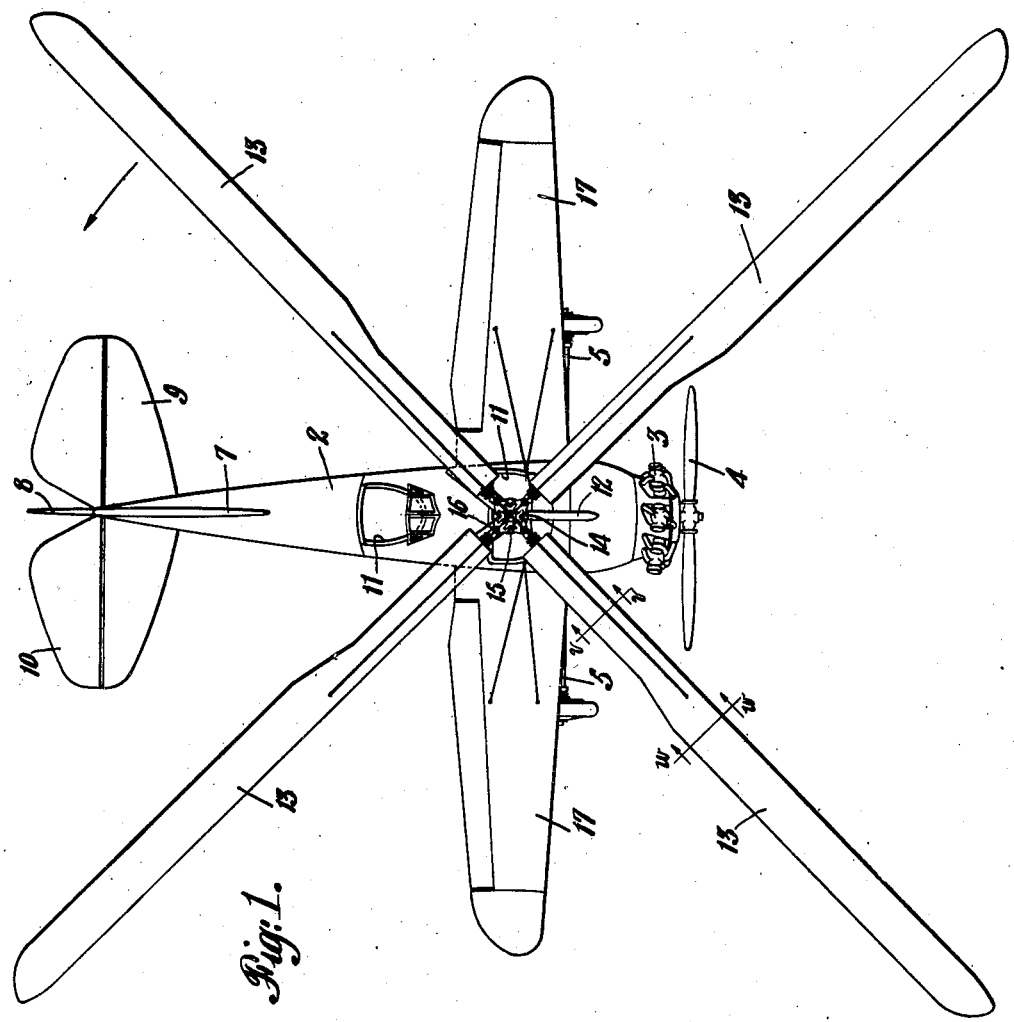

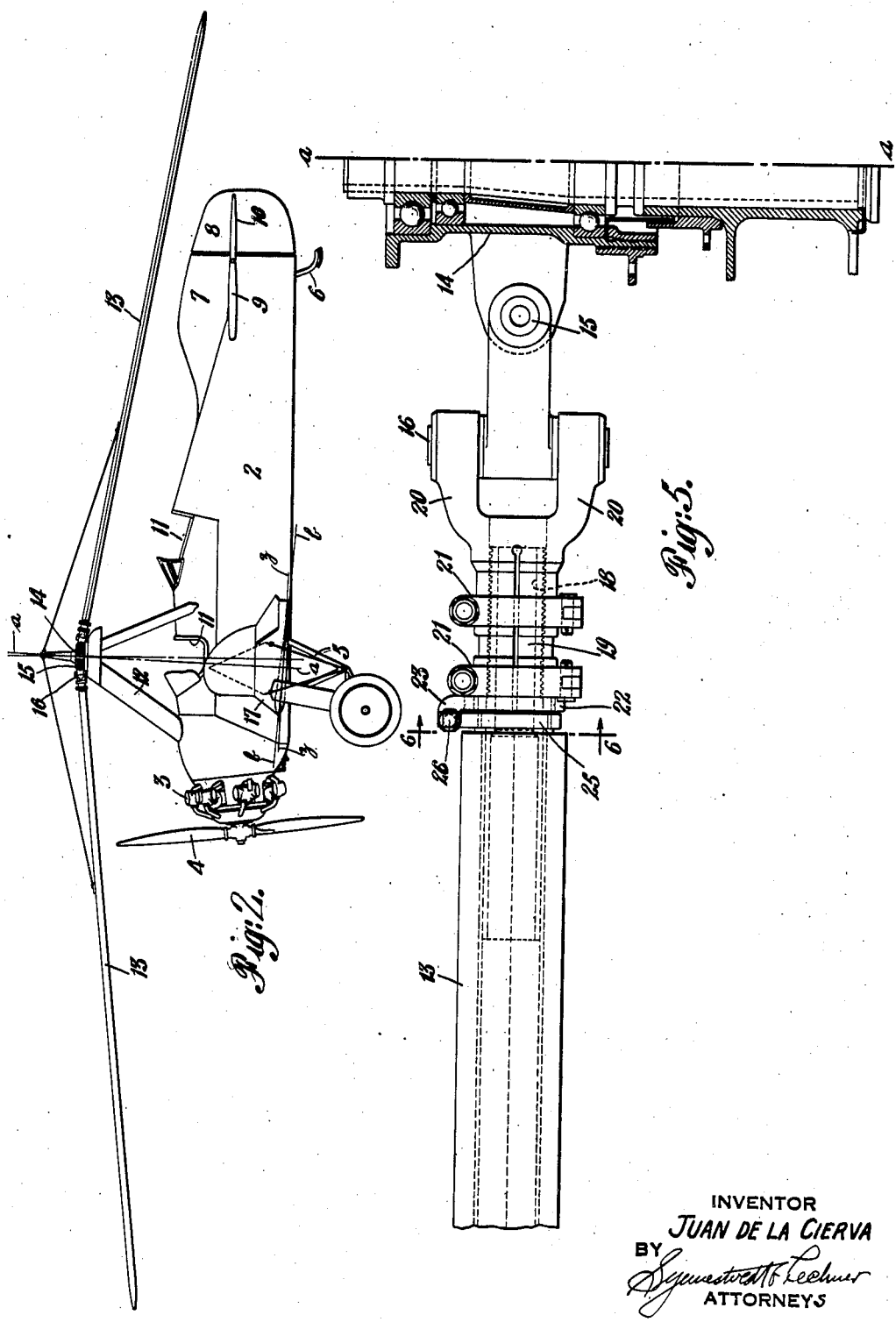

1,947,901

UNITED STATES PATENT OFFICE 1,947,901

AIRCRAFT OF THE ROTATIVE WING TYPE

Juan de la Cierva, Madrid, Spain, assignor to Autogiro Company of America, Philadelphia, Pa., a corporation of Delaware Application December 4, 1930. Serial No. 500,064

32 Claims. (Cl. 244—19)

This invention relates to aircraft of the air-rotated swinging-wing type, (constituting an improvement upon the construction disclosed and claimed in my prior Patent No. 1,590,497, issued June 29th, 1926), and it is, in one of its simplest aspects, or as to one of its several features, based on subject-matter disclosed, but not claimed, in my application Serial No. 145,654, filed November 1, 1926 and in Great Britain November 24, 1925, and is to that extent a continuation of said application. (Said British application was granted as Patent No. 264,753. Said United States application, after dividing therefrom the particular subject matter common to it and to this case, issued as Patent No. 1,811,303.) The present invention further embodies certain improvements, of substantial advantage, over the construction disclosed and claimed in my co-pending application Serial No. 414,901, filed December 18, 1929, in which supplemental fixed wings are employed in conjunction with an auto-rotative set of swingingly-pivoted wings or blades.

Purposes and advantages

In general, the present invention contemplates, in its broad aspect, the increasing of the efficiency of operation of the rotary wing system of my Patent No. 1,590,497, and it further involves improvements in the construction and operation of the aircraft as a whole, particularly of the modified type shown in said application Serial No. 414,901, in such manner as to increase, in a given aircraft construction, not only the top speed, but also the angle and rate of climb, and the controllability of the ship at slow speeds. This general object is of even greater importance with the type of aircraft here under consideration than it would be in connection with the ordinary airplane, because of the fact that, since the present craft is capable of straight vertical descent, it is highly desirable, if not actually essential, that the craft be able to climb exceptionally steeply out of a very small field, and be well under control at low speeds.

More particularly, the present invention contemplates certain novel features of proportioning and disposition of the blades and blade systems, and the relation thereof to the fixed lifting surfaces, and the employment of definitely positive blade-incidence settings in air-rotated pivoted-wing constructions, that is, a setting of the individual blades of the rotor, on the axis or hub thereof, which is one of positive incidence, considered with respect to a "no-lift" setting in relation to a mean path or plane of rotation perpendicular to the said axis, irrespective of whether or not said axis itself be rearwardly inclined (as shown in Fig. 3 of said Patent No. 1,590,497) to give a generally positive incidence to the rotor considered as an entirety.

In other words, I have found that, whether or not a positive setting of the rotor's path of travel (or "disc" as it is sometimes termed) is employed, I can, at one and the same time, improve both the lifting efficiency and the speed of the craft, by setting each blade of the rotor up to a slight positive-lift angle of incidence as compared with an individual blade setting at "no-lift" or at negative position with respect to a mean average plane which is perpendicular to the axis of rotation, and I attain this dual advantage in the face of the known fact that in an ordinary fixed-wing airplane changes in wing incidence which make for improvement in lift tend toward a decrease, rather than increase, in top speed of the craft.

I have further found that I can best attain these desirable results, at least when employing substantially symmetrical blade sections, with an individual positive-incidence setting of the blades on their common axis, of preferably around 2° or 3°, but not more than 5°, as compared with the substantially neutral setting illustrated in my said Patent No. 1,590,497. This is productive of two rather striking results: first, that at rather slow speeds of translational movement of the craft, the rotor operates at a somewhat slower speed of rotation than one with blades set at no-lift or at a slight negative incidence, but with increased lifting efficiency and decreased frictional resistance; and second, at higher speeds of the craft, the rotor tends to run materially faster than its rotational speeds at low speeds of the craft, rather than slower or substantially constant as is respectively the case with rotors, in which the effective blade incidence is negative or neutral; all of which produces an important result, later to be considered.

While the positive-incidence blade setting, with respect to rotor axis and rotational plane, was coupled, in the showing of my co-pending application Serial No. 145,654, with a particular form of articulated joint in order to control the movements of the blades and to obtain certain desired effects as to extreme angles of attack in the air, the positive setting per se is of wider application, and it should be understood, can be applied in connection with a straight transverse articulation such as employed in the construction of my patent first above-mentioned, or with other forms of rotors and joints, such, for example, as shown in my Patent No. 1,682,893, issued September 4, 1928.

According to the most complete development of the invention, however, I contemplate combining, in the same construction, fixed wings of a certain positive incidence in conjunction with a rotor having freely-swinging air-rotated blades, each of which blades is itself set at positive incidence with relation to a no-lift setting on the axis, which is productive of the following advantage:

Since the rotor, when so constructed, at low speeds of the craft turns slightly slower, giving greater lifting efficiency and reducing resistance, the rotor itself will produce very quick take-off and steep climbing, and the fixed supplemental wings, being in the downwash of the rotor always work at relatively low incidence and may be made of low-lift, high-speed section, preferably of thin symmetrical section, which reduces profile drag to a minimum. On the other hand, as speed increases, the relative load taken by the fixed wings gradually increases, until at top speeds they may assume as much as 20% to 35% of the total load. The result of this is to diminish the air reaction on the rotor (which, as hereinbefore stated, when constructed with the individual blades set at positive angles, would tend to rotate faster at increased speeds) thus maintaining the rotor speed practically constant throughout the entire flight range so that the latter always rotates at the speed of optimum efficiency, it being understood, of course, that the rotor for any given ship is proportioned to operate most efficiently at a given rotational speed, and stresses are designed for that speed. The climb of the machine is thus materially improved due to the increased lifting efficiency of the rotor, while the top speed of the machine is also materially improved due to the rotor being maintained at a rotational speed of optimum efficiency and to the fact that the fixed wings may be made of low-drag section, instead of high-lift section, as is customarily used in aircraft design.

Before proceeding to the detailed description of the invention, one other aspect of the combined construction should be here considered, and that is: the controllability of the craft. At low speeds, or at high angles of attack, a low-drag fixed-wing section (especially when made of thin symmetrical cross-section) normally has the greatest tendency to "stall", and ailerons or other control surfaces mounted thereon tend to become ineffective. With a rotor of the present construction, however, mounted on the craft above the fixed wings, there is an increased downwash or deflection of air from the rotor passing over the fixed wings, at low speeds and/or high angles of attack, which reduces the tendency to stall to such a point that effective action of the fixed wings and ailerons is not impaired, except at extremely slow speeds, and under those conditions the pendular stability of the craft becomes so great that aileron control is not necessary.

Further objects and advantages of the present invention will appear from the following description, taken together with the accompanying drawings, in which:

Figure 1 is a plan view of an aircraft embodying the present invention;

Figure 2 is a side elevation of the same, with the rotor turned 45° from the position of Fig. 1, the rotor blades being at rest and the near blade being removed, for the sake of clarity, and clearly showing the fixed wing incidence setting;

Figure 3 is a similar front elevational view;

Figure 4 is an enlarged end elevational view of a blade mounted on the common rotor axis with positive individual incidence, the form of articulative mounting being that which is disclosed and claimed in my copending application, Serial No. 145,354 which issued as Patent No. 1,811,303 on June 23, 1931;

Figure 5 is an enlarged vertical half-section (with parts in elevation) of a rotor hub construction, showing the attachment of a blade thereto after the manner of the construction of Figs. 1, 2 and 3, and illustrating a means of setting the blade incidence at different fixed positive angles at the root; and Figure 6 is a section on the line 6—6 of Fig. 5, with the contour and setting of an inner section, as well as a section farther out on the blade, shown in dot-and-dash lines.

Description

By reference first to the three general views, it will be seen that I have illustrated an aircraft of the rotative-wing type, having a body or fuselage 2, the usual engine and propellor 3, 4, landing gear 5, 6, fin, rudder, stabilizer, and elevator 7, 8, 9, 10, cock pits 11, 11, and pylon construction 12 for supporting the rotor.

The primary sustention of the aircraft is effected by an air-driven, swinging-wing rotor composed of four blades 13, which, for individual freedom to assume positions of equilibrium between centrifugal, lift, drag, anti-drag, and other forces, are flexibly mounted on a common rotative hub 14 as by the horizontal pivots 15 and vertical pivots 16.

For purposes with which the present case is not concerned, (but which are involved in my copending application No. 546,680 filed June 25, 1931) the common axis, $a$—$a$ of the rotor is laterally inclined as seen in Fig. 3, and for the best results in operation of the invention herein disclosed the same axis is preferably slightly upwardly and rearwardly inclined as seen in Fig. 2, and although the latter is not essential, it tends to carry the streamline form of the fuselage in the proper attitude in cruising flight.

As thus far described the construction is in general similar to that involved in my aforementioned Patent No. 1,590,497, although vertical pivot axes for the blades is an improvement which is specifically covered in my copending application Serial No. 145,655, filed November 1, 1926, issued May 24, 1932 as Patent No. 1,859,584.

In addition to the foregoing, the craft is provided with a pair of relatively small fixed aerofoils or lifting wings 17 somewhat after the construction shown in my copending application Serial No. 414,901, but differing therefrom as to form, disposition and functioning.

The blades 13 may be mounted for their articulative, force-compensating movements, each on a single oblique pivot 13$a$ as in Figure 4, or preferably by a construction such as shown in Figures 1, 2, 3, 5 and 6, in which, for each blade a horizontal pivot 15 lying in a plane perpendicular to the axis of rotation $a$—$a$ and a vertical pivot 16 lying in a plane which includes said axis, are provided. In either event, the blade 13, being symmetrical in section, and having its chord of symmetry set at a slight positive angle with respect to the mean plane of rotation, that is, with the chord line $x$—$x$ making a slight positive angle $y$ with respect to a plane $z$—$z$ which is perpendicular to the axis $a$—$a$ when the blade is in neutral or mid position of its articulative mounting, there is an individual positive blade incidence with respect to a no-lift setting with relation to a plane perpendicular to the common axis of rotation, and it is such a blade incidence to which I refer in the present case, regardless of what may be the incidence or average incidence of the rotor considered as a whole, and regardless of variations in angle of attack of the blades on the air in flight due to changes in attitude of the ship or of the rotor or to articulative changes of the blades.

If a non-symmetrical aerofoil section be employed, and let us say, that a positive setting of two and a half degrees (which is the incidence setting of the symmetrical section of Fig. 6) be desired, the setting of the chord of such section might physically be negative with respect to the plane $z$—$z$, still attaining the two and a half degrees positive setting with respect to the no-lift setting, which I desire. Similarly, if a blade be employed which has a different sectional contour at different points longitudinally thereof, or different built-in effective incidence at different points therealong (as shown in my Patent No. 1,692,081, issued November 20, 1928), or if a blade (such as disclosed in my copending application Serial No. 532,603, filed April 24, 1931) be employed, in which the blade, though of uniform symmetry from end to end of its effective lifting portion, is variable as to torsional flexure under the influence of forces in flight, then, to carry out the present invention, such blades would be set at the root, i. e., mounted upon the rotative hub at such an angle that their average effective incidence in flight would be at some fixed point not less than approximately two degrees and not more than approximately five degrees of positive lift incidence with respect to a no-lifting incidence of the particular blade calculated with relation to the plane $z$—$z$ perpendicular to the common rotative axis $a$—$a$. With certain other types of aerofoils the incidence might be somewhat different. For example, this range may be extended downwardly by employing a lower-lift section or upwardly by employing a higher-lift section, the range 2° to 5° being preferable for a thin or medium-thick section of substantially fixed center of pressure (such as a symmetrical aerofoil), but the range must always be such that autorotation is absolutely assured.

The foregoing are cited to show that different types of blade construction may be employed in carrying out the present invention, although I prefer to use a blade of thin or medium thick substantially symmetrical section having a small amount of torsional flexure in flight, about 1° or 1½° between tip and root. In addition to its aerodynamical advantages a section of relatively fixed center of pressure is preferable to reduce torsional flexure and minimize structural difficulties.

In order to obtain the most advantageous positive setting for a given set of blades within the limits prescribed, which, as before indicated, are calculated to avoid undue slowing up of the rotor at low flight speeds, I preferably employ a construction in which means is provided for permitting different fixed settings to be made between the root of the blade and the articulative joint or joints, so that said joints need not be disturbed, but can be built always at right angles to each other and respectively tangent and parallel to the common axis of rotation if desired. To this end I may utilize a construction such as shown at 9, 10 in Figure 4 of my copending application Serial No. 414,901, which also includes means (such as the bolts and clamps shown at the right of that figure) for preventing change in incidence adjustment during flight, such unwanted change being most undesirable as it would probably result in throwing the blades into such an incidence as would cause slowing up and collapse of the rotative system.

An improved form of construction for accomplishing this purpose, the specific arrangement of which is not my invention per se, but is disclosed and claimed in the copending application of Harold F. Pitcairn, Serial No. 552,298, filed July 22, 1931, is shown in Figures 5 and 6 of the instant case, in which the hub end of the blade spar 18 is screw-threaded into a partially split socket 19 having forks 20 for mounting the same on the pivot axis 16. When the clamps 21 are released, and splined ring 22 is slipped back on the socket, the blade may be screwed into place. Ring 22 is then slid outward on its splined connection with the socket until its ears 23 are in place, one on each side of the ear 24 on ring 25, which latter is fixed on the blade spars against rotation. Final adjustment of the spar, so as to obtain, with whatever form or contour of blade employed, the desired average effective positive incidence of the blade, is secured by means of the adjusting screws and lock nuts 26, 27, which, with the ears 23, are so arranged as to provide a range of physical adjustment preferably of from 7° negative to 7° positive, so that the average effective positive incidence of the blade with respect to no-lift incidence may be had with any of the aforementioned types of blade construction. After this setting is accomplished clamping collars 21 are tightened in place so that no possible change in blade incidence may take place in flight. In Fig. 6 I have shown, in dot-and-dash lines, blade sections $v$ and $w$, equivalent to those taken at $v$—$v$ and $w$—$w$ in Fig. 1.

Returning now to the supplemental fixed lifting surfaces 17, it will be seen that in accordance with the best embodiment of the present invention as hereinbefore described, these are formed of a thin, symmetrical section of low profile drag, and as will be seen in Figure 2 are set with their symmetrical chord line $b$—$b$ to give a slightly positive incidence with respect to a no-lift incidence calculated with relation to the plane $z$—$z$ perpendicular to the axis of rotation $a$—$a$.

I find, in actual practice, to obtain to the fullest extent the objects and advantages set forth in the first part of this specification, that the positive lift incidence of the fixed wings should be within a range approximately 2° to 4° above the no-lift incidence, for a range of blade incidence of approximately 2° to 5°, both figured with respect to no-lift incidence relative to a plane perpendicular to the axis of rotation of the blades. Furthermore, utilizing slight positive incidence both on the individual rotative blade and on the fixed wing, the former being preferably slightly greater than the latter, I obtain the desired results of increased angle of climb, higher efficiency of both rotative and fixed wings, as well as of the craft as a whole, and greater top speed due to the interaction of these two lifting mechanisms, one upon the other, and this with a marked improvement in the way of obtaining uniform speed of rotation of the rotor at its optimum efficiency of rotation, through the whole range of flight speeds.

Still further, to obtain to the fullest extent the advantages hereinbefore discussed, especially as to the combined effects of the positive-incidence rotor blades and positive incidence fixed wings, such as: increased lifting efficiency, increased top speed of the craft, and maintenance of the closest possible uniformity of rotor speed, it is preferable to make the total area of the fixed wings equal to about 75% to 100% of the amount of area of the four rotor blades, although in certain craft, for constructional reasons, it is desirable that the fixed wings be proportioned somewhat smaller, say 50% of rotative blade area. With fixed wing area proportioned in that range (especially between the 75% and 100% limits) and with positive incidence settings of both fixed and rotary wings, the rotor may be made to operate at a substantially uniform speed of rotation through the range of flight speeds of the craft, and such rotational speed, computed at the blade tip, will approximate 140% to 200% of the top speed of the craft. I have further found that if the relative incidence settings of the fixed and rotary wings and the relative areas thereof be arranged in accordance with this invention, the "solidity", which is approximately the ratio of rotary blade area to the disc area traversed by the blades, may vary over a wide range without impairment of the advantages hereinbefore fully set forth.

I claim:—

1. In an aircraft having its usual means of forward propulsion, a primary sustaining system comprising a normally autorotationally air actuated rotor which includes a rotative axis structure mounted to be freely rotative about a generally upright axis, and wing means pivotally or oscillatably mounted on said axis structure in position to be auto-rotated by relative airflow in all normal attitudes of flight, said wing means being initially set, when in their mid-position of oscillation, at an autorotational positive lift incidence as compared with a no-lift setting related to a plane perpendicular to the rotational axis.

2. In an aircraft, a sustaining rotor construction mounted for autorotational movement with respect to an upright axis member under the influence of relative airflow, said rotor including a blade of substantially fixed centre of pressure aerofoil section arranged, with respect to the axis member, in such manner as to be free to assume a position of equilibrium between lift and inertia forces at various points in its general path of rotative movement, said blade being set at a positive incidence calculated with respect to the no-lift position relative to a plane perpendicular to the axis of rotation.

3. In an aircraft, a sustaining rotor construction having blades mounted for movement with respect to an axis member and so proportioned that, under the influence of air currents, the blades have an average autorotational speed at the tip substantially in excess of the maximum flight speed of which the craft is capable, the blades of the rotor being of an aerofoil section of substantially fixed centre of pressure and arranged, with respect to the axis member, in such manner as to be free to assume positions of equilibrium between inertia and lift forces at various points in their general path of rotative travel and said blades being set at a positive incidence calculated with respect to the no-lift position relative to a plane perpendicular to the axis of rotation.

4. In an aircraft, a sustaining rotor construction having blades mounted for movement with respect to an axis member and so proportioned that, under the influence of air currents, the blades have an average rotational speed at the tip substantially in excess of the translational flight speed of which the craft is capable, the blades of the rotor being arranged, with respect to the axis member, in such manner as to be free to assume positions of equilibrium between inertia and lift forces at various points in their general path of rotative travel, together with a substantially fixed aerofoil of an effective area approximating 50% to 100% of the area of the rotative blades.

5. In an aircraft, a sustaining rotor construction having blades mounted for movement with respect to an axis member and so proportioned that, under the influence of air currents, the blades have an average rotational speed at the tip substantially in excess of the translational flight speed of which the craft is capable, the blades of the rotor being arranged, with respect to the axis member, in such manner as to be free to assume positions of equilibrium between inertia and lift forces at various points in their general path of rotative travel, together with a substantially fixed aerofoil of an effective area approximating 50% to 100% of the area of the rotative blades, said fixed aerofoil being set at a positive lift incidence.

6. In an aircraft, a sustaining rotor construction having blades mounted for movement with respect to an axis member and so proportioned that, under the influence of air currents, the blades have an average rotational speed at the tip substantially in excess of the maximum flight speed of which the craft is capable, the blades of the rotor being arranged, with respect to the axis member, in such manner as to be free to assume positions of equilibrium between inertia and lift forces at various points in their general path of rotative travel, together with a substantially fixed aerofoil of an effective area approximating 50% to 100% of the area of the rotative blades, said fixed aerofoil being set at a positive lift incidence such as to tend to variably affect the rotational speed of the blades as the air-craft speed varies.

7. In an aircraft, a sustaining rotor construction having blades mounted for movement with respect to an axis member and so proportioned that, under the influence of air currents, the blades have an average rotational speed at the tip substantially in excess of the maximum flight speed of which the craft is capable, the blades of the rotor being arranged, with respect to the axis member, in such manner as to be free to assume positions of equilibrium between inertia and lift forces at various points in their general path of rotative travel, together with a substantially fixed aerofoil of an effective area approximating 50% to 100% of the area of the rotative blades, said fixed aerofoil being set at a positive lift incidence such as to tend to variably affect the rotational speed of the blades as the aircraft speed varies, and the individual blades being set at a positive average effective incidence such that their tendency to variation in rotational speed with changes in aircraft speed is substantially counteracted by the effect of said fixed aerofoil.

8. In an aircraft of the rotative-blade type, a rotor axis member, a rotor, mounted for rotation thereon and including a blade, positioned to be autorotationally actuable by relative air-flow, having means of self-adjustment so that it may assume positions of substantial equilibrium between lift and inertia forces acting thereon, said blade being so set with respect to the rotor that it has a predetermined angle such that the average effective incidence of the blade is positive as compared with a no-lift setting relative to a plane perpendicular to said axis, and a relatively fixed lifting aerofoil surface mounted on the craft beneath the rotating blade or blades within the influence of the downwash of the latter.

9. In an aircraft of the rotative-blade type, a rotor axis member, a rotor, mounted for rotation thereon and including a blade, actuable by relative air-flow, having means of self-adjustment so that it may assume positions of substantial equilibrium between lift and inertia forces acting thereon, said blade being so set with respect to the rotor that it has a predetermined angle such that the average effective incidence of the blade is positive as compared with a no-lift setting relative to a plane perpendicular to said axis, and a relatively fixed lifting aerofoil surface mounted on the craft at an average effective lift incidence which is positive as compared with a no-lift incidence calculated with respect to the said perpendicular plane.

10. In an aircraft of the rotative-blade type, a rotor axis member, a rotor, mounted for rotation thereon and including a blade, actuable by relative air-flow, having means of self-adjustment so that it may assume positions of substantial equilibrium between lift and inertia forces acting thereon, said blade being so set with respect to the rotor that it has a predetermined angle such that the average effective incidence of the blade is positive as compared with a no-lift setting relative to a plane perpendicular to said axis, and a relatively fixed lifting aerofoil surface mounted on the craft at an average effective lift incidence which is positive as compared with a no-lift incidence calculated with respect to the said perpendicular plane, the positive incidence of the fixed aerofoil being less than that of the individual rotative blade.

11. In an aircraft of the rotative-blade type a rotor axis member, an autorotative rotor, mounted for rotation thereon and including a blade, actuable by relative air-flow, having means of self-adjustment so that it may assume positions of substantial equilibrium between lift and inertia forces acting thereon, said blade being so set with respect to the rotor that it has a predetermined angle such that the average effective incidence of the blade is positive as compared with a no-lift setting relative to a plane perpendicular to said axis, and a relatively fixed lifting aerofoil surface of low profile drag mounted so as to be substantially influenced at low flight speeds by the increased downwash effected by the positive-incidence setting of the rotative blades.

12. In an aircraft of the rotative-blade type, a rotor axis member, a rotor, mounted for rotation thereon and including a blade, positioned to be autorotationally actuable by relative air-flow, having means of self-adjustment so that it may assume positions of substantial equilibrium between lift and inertia forces acting thereon, said blade being so set with respect to the rotor that it has a predetermined angle such that the average effective incidence of the blade is positive as compared with a no-lift setting relative to a plane perpendicular to said axis, said rotor being proportioned to take the major lift load under all flight conditions, and a relatively fixed lifting aerofoil surface of substantially symmetrical section and positioned to take a progressively increasing proportion of the lift load as forward speed increases.

13. In an aircraft of the rotative-blade type, a rotor axis member, a rotor, mounted for rotation thereon and including a blade, positioned to be autorotationally actuable by relative air-flow, having means of self-adjustment so that it may assume positions of substantial equilibrium between lift and inertia forces acting thereon, said blade being so set with respect to the rotor that it has a predetermined angle such that the average effective incidence of the blade is positive as compared with a no-lift setting relative to a plane perpendicular to said axis, and a relatively fixed lifting aerofoil surface of substantially fixed centre of pressure section.

14. In an aircraft of the rotative-blade type, a rotor axis member, a rotor, mounted for rotation thereon and including a blade, actuable by relative air-flow, having means of self-adjustment so that it may assume positions of substantial equilibrium between lift and inertia forces acting thereon, said blade being so set with respect to the rotor that it has a predetermined angle such that the average effective incidence of the blade is positive as compared with a no-lift setting relative to a plane perpendicular to said axis, and a relatively fixed lifting aerofoil surface of substantially symmetrical section mounted on the craft at an average effective lift incidence which is positive as compared with a no-lift incidence calculated with respect to the said perpendicular plane.

15. In an aircraft of the rotative-blade type, a rotor axis member, a rotor, mounted for rotation thereon and including a blade, actuable by relative air-flow, having means of self-adjustment so that it may assume positions of substantial equilibrium between lift and inertia forces acting thereon, said blade being so set with respect to the rotor that it has a predetermined angle such that the average effective incidence of the blade is positive as compared with a no-lift setting relative to a plane perpendicular to said axis, and a relatively fixed lifting aerofoil surface of substantially fixed centre of pressure section mounted on the craft at an average effective lift incidence which is positive as compared with a no-lift incidence calculated with respect to the said perpendicular plane.

16. In an aircraft of the rotative-blade type, a rotor axis member, a rotor, mounted for rotation thereon and including a blade, actuable by relative air-flow, having means of self-adjustment so that it may assume positions of substantial equilibrium between lift and inertia forces acting thereon, said blade being so set with respect to the rotor that it has a predetermined angle such that the average effective incidence of the blade is substantially not less than 2° nor more than 5° positive as compared with a no-lift setting relative to a plane perpendicular to said axis, and a relatively fixed lifting aerofoil surface mounted on the craft at an average effective lift incidence which is positive as compared with a no-lift incidence calculated with respect to the said perpendicular plane.

17. In an aircraft of the rotative-blade type, a rotor axis member, a rotor, mounted for rotation thereon and including a blade, actuable by relative air-flow, having means of self-adjustment so that it may assume positions of substantial equilibrium between lift and inertia forces acting thereon, said blade being so set with respect to the rotor that it has a predetermined angle such that the average effective incidence of the blade is substantially not less than 2° nor more than 5° positive as compared with a no-lift setting relative to a plane perpendicular to said axis, and a relatively fixed lifting aerofoil surface mounted on the craft at an average effective lift incidence which is approximately from 2° to 4° positive as compared with a no-lift incidence calculated with respect to the said perpendicular plane.

18. In an aircraft, a body; means of forward propulsion capable of effecting rapid forward flight; and a main sustaining means comprising a rotor with its center approximately vertically above the central point of the craft; said rotor comprising a plurality of wings of very long and narrow plan form and of aeroform cross section positioned to be aerodynamically rotated in flight; a normally freely rotative upright axis structure about which said wings are arranged, pivotal mounting means for said wings on said axis structure constructed to provide for variation in the aerodynamical angles of attack of said wings to obviate differential lift; said wings having in flight, when at an intermediate position of pivotation, an average autorotational incidence which is at positive-lift with relation to a plane perpendicular to the axis of rotation; the elongated form, the area and the average incidence of said rotative wings being so proportioned with relation to the weight of the craft that with the full burden of sustention falling upon said rotor the wings thereof have an average rotational speed at the tip greater than the top forward speed of which the craft is capable under the influence of said forward propulsion means.

19. In an aircraft, a rotor comprising a group of rotary sustaining wings positioned to be normally freely rotative in flight by the relative air flow, the rotor being so mounted as to be subject to relative translational movement with respect to the air in a plurality of directions ranging approximately between a substantially edgewise movement and a substantially axial movement, whereby a tendency toward variation in rotational speed of the rotor is produced, and automatic aerodynamically-acting means for positively counteracting such tendency in flight.

20. In an aircraft, a body; means of forward propulsion capable of effecting rapid forward flight; and a main sustaining means comprising a rotor with its center approximately vertically above the central point of the craft; said rotor comprising a plurality of wings of very long and narrow plan form and of aeroform cross section positioned to be aerodynamically rotated in flight; a normally freely rotative upright axis structure about which said wings are arranged, pivotal mounting means for said wings on said axis structure constructed to provide for variation in the aerodynamical angles of attack of said wings to obviate differential lift; said wings having in flight, when at an intermediate position of pivotation, an average incidence which is at positive-lift with relation to a plane perpendicular to the axis of rotation; the elongated form, the area and the average incidence of said rotative wings being so proportioned with relation to the weight of the craft that with the full burden of sustention falling upon said rotor the wings thereof have an average rotational speed at the tip greater than the top forward speed of which the craft is capable under the influence of said forward propulsion means; and supplemental sustaining means comprising a non-rotative aeroform lifting surface positioned to assume an increasing burden of the lift with increase in forward speed, and being of such area and lifting capacity as to prevent over-speeding of the rotor under the influence of the air-flow thereon at high-speed forward flight.

21. The combination, in an aircraft, of means for effecting forward propulsion, a sustaining rotor, arranged to be continuously rotating when in flight, and comprising aerodynamically-actuable rotative aerofoils, a normally freely rotative axis structure on which said aerofoils are mounted to be revolved by the relative air-flow in flight, pivotal or oscillative mounting means for said aerofoils on said axis structure, said aerofoils having in flight, when at mid-position of oscillation, an average positive-lift incidence with relation to a plane perpendicular to the axis of rotation which incidence is within the auto-rotational range, said pivotal or oscillative mounting being constructed to provide for variation in the aerodynamical angles of attack of said aerofoils to compensate for differential lift and the like, and a substantially fixed or non-rotative aerofoil positioned on the craft at a slightly positive lift incidence with the craft at normal cruising attitude whereby the fixed aerofoil progressively takes an increasing burden of the lift as the speed of forward flight increases and obviates excessive rotational speed of the rotative aerofoils, and the common axis of rotative aerofoils being extended generally in an upward direction and approximately perpendicular to the general plane of the fixed aerofoil whereby the rotative aerofoils, operating at said positive-lift incidence, take the largest proportion of the whole burden of the lift during vertical descent.

22. The combination, in an aircraft, of means for effecting forward propulsion, a sustaining rotor, arranged to be continuously rotating when in flight, and comprising aerodynamically-actuable rotative aerofoils, a normally freely rotative axis structure on which said aerofoils are mounted to be revolved by the relative air-flow in flight, pivotal or oscillative mounting means for said aerofoils on said axis structure, said aerofoils having in flight, when at mid-position of oscillation, an average positive-lift incidence with relation to a plane perpendicular to the axis of rotation which incidence is between 2° and 5° positive with respect to said plane, said pivotal or oscillative mounting being constructed to provide for variation in the aerodynamical angles of attack of said aerofoils to compensate for differential lift and the like, and a substantially fixed or non-rotative aerofoil positioned on the craft at a slightly positive lift incidence with the craft at normal cruising attitude whereby the fixed aerofoil progressively takes an increasing burden of the lift as the speed of forward flight increases and obviates excessive rotational speed of the rotative aerofoils, and the common axis of the rotative aerofoils being extended generally in an upward direction and approximately perpendicular to the general plane of the fixed aerofoil whereby the rotative aerofoils, operating at said positive-lift incidence, take the largest proportion of the whole burden of the lift during vertical descent.

23. The combination, in an aircraft, of means for effecting forward propulsion, a sustaining rotor, arranged to be continuously rotating when in flight, and comprising aerodynamically-actuable rotative aerofoils, a normally freely rotative axis structure on which said aerofoils are mounted to be revolved by the relative air-flow in flight, pivotal or oscillative mounting means for said aerofoils on said axis structure, said aerofoils having in flight, when at mid-position of oscillation, an average positive-lift incidence with relation to a plane perpendicular to the axis of rotation which incidence is within the autorotational range, said pivotal or oscillative mounting being constructed to provide for variation in the aerodynamical angles of attack of said aerofoils to compensate for differential lift and the like, and a substantially fixed or non-rotative aerofoil positioned on the craft at a lift incidence which is also positive with respect to said plane whereby the fixed aerofoil progressively takes an increasing burden of the lift as the speed of forward flight increases and obviates excessive rotational speed of the rotative aerofoils, and the common axis of the rotative aerofoils being extended generally in an upward direction and approximately perpendicular to the general plane of the fixed aerofoil whereby the rotative aerofoils, operating at said positive-lift incidence, take the largest proportion of the whole burden of the lift during vertical descent.

24. In an aircraft of the rotative-blade type, a rotor axis member, a rotor, mounted for rotation thereon and including a blade, positioned to be autorotationally actuable by relative air-flow, having means of self-adjustment so that it may assume positions of substantial equilibrium between lift and inertia forces acting thereon, said blade being so set with respect to the rotor that it has a predetermined angle such that the average effective incidence of the blade is positive as compared with a no-lift setting relative to a plane perpendicular to said axis, there being mounting means for the blade arranged to restrain the blade as against bodily shift about its longitudinal axis in flight.

25. In an aircraft of the rotative-blade type, a rotor axis member, a rotor, mounted for rotation thereon and including a blade, positioned to be autorotationally actuable by relative air-flow, having means of self-adjustment so that it may assume positions of substantial equilibrium between lift and inertia forces acting thereon, said blade being so set with respect to the rotor that it has a predetermined angle such that the average effective incidence of the blade is substantially not less than 2° nor more than 5° positive as compared with a no-lift setting relative to a plane perpendicular to said axis, and being at least in part of medium-thick section of relatively fixed centre of pressure, there being mounting means for the blade arranged to restrain the blade as against bodily shift about its longitudinal axis in flight.

26. In an aircraft of the rotative-blade type, a rotor axis member, a rotor, mounted for rotation thereabout and including a blade, positioned to be autorotationally actuable by relative air-flow, having means of self-adjustment so that it may assume positions of equilibrium between inertia and lift forces acting thereon, and mounting means for the blade whereby the latter is set on the rotor at a predetermined fixed angle such that the average effective incidence of the blade is substantially not less than 2° nor more than 5° positive as compared with a no-lift setting relative to a plane perpendicular to said axis, and being at least in part of medium-thick section of relatively fixed centre of pressure.

27. In an aircraft having an upright rotor axis member with air-rotated sustaining means mounted thereon in position for continuous autorotation in all styles of flight and automatically displaceable to positions of substantial equilibrium between lift and inertia forces, means for setting the sustaining means at fixed initial average effective positive incidence with respect to a no-lift position relative to a plane perpendicular to the axis of rotation and means precluding the possibility of change of such setting, with respect to the axis member, in flight.

28. In an aircraft having an upright rotor axis member with air-rotated sustaining means mounted thereon in position for continuous autorotation in all styles of flight and automatically displaceable to positions of substantial equilibrium between lift and inertia forces, adjustable means for variably setting the sustaining means at fixed initial average effective positive incidence with respect to a no-lift position relative to a plane perpendicular to the axis of rotation, and means precluding the possibility of change of such setting, with respect to the axis member, in flight.

29. In an aircraft having a rotor axis member with air-rotated sustaining means mounted thereon for autorotation and having supplemental pivot means permitting automatic displacement to positions of substantial equilibrium between lift and inertia forces, and adjustable means for variably setting the sustaining means at fixed initial average effective positive incidence with respect to a no-lift position relative to a plane perpendicular to the axis of rotation, said setting means being adjustable without disturbing said pivot means.

30. In an aircraft having a rotor axis member with air-rotated sustaining means mounted thereon for autorotation and having a plurality of supplemental pivot means permitting automatic displacement to positions of substantial equilibrium between drag and anti-drag, lift and inertia forces, and adjustable means for variably setting the sustaining means at fixed initial average effective positive incidence with respect to a no-lift position relative to a plane perpendicular to the axis of rotation, said setting means being adjustable without disturbing said pivot means.

31. In an aircraft having a rotor axis member with air-rotated sustaining means mounted thereon for autorotation and having a plurality of supplemental pivot means permitting automatic displacement to positions of substantial equilibrium between drag and anti-drag, lift and inertia forces, and adjustable means for variably setting the sustaining means at fixed initial average effective positive incidence with respect to a no-lift position relative to a plane perpendicular to the axis of rotation, said setting means being adjustable without disturbing the relation between said pivot means.

32. In rotor blade mounting mechanism, a plurality of articulations, means holding them substantially fixedly on spaced-apart centers and at predetermined relative angles, and means for altering blade incidence without disturbing such spacing or angularity.

JUAN DE LA CIERVA